United States Patent [19]

Teva

[11] Patent Number: 4,922,504
[45] Date of Patent: May 1, 1990

[54] LASER APPARATUS

[76] Inventor: Gil Teva, 7 Havazelet Street, Jerusalem, Israel

[21] Appl. No.: 290,284

[22] Filed: Dec. 23, 1988

[51] Int. Cl.⁵ .............................................. H01S 3/097
[52] U.S. Cl. ...................................... 372/87; 372/18; 372/35
[58] Field of Search ....................... 372/87, 82, 81, 88, 372/18, 34, 35

[56] References Cited

U.S. PATENT DOCUMENTS

| | | | |
|---|---|---|---|
| 4,247,829 | 1/1981 | Yagi et al. | 372/87 |
| 4,375,690 | 3/1983 | Tabata et al. | 372/88 |
| 4,420,835 | 12/1983 | Hattori et al. | 372/88 |
| 4,617,669 | 10/1986 | Kuhn | 372/72 |
| 4,752,937 | 6/1988 | Gorisch et al. | 372/88 |

Primary Examiner—Leon Scott, Jr.

[57] ABSTRACT

There is provided a gas discharge laser with a purality of elongated parallel electrodes defining in space a honeycomb structure in the form of a plurality of immaginary triangular or square structures, where in the case of the triangular arrangement each of the three parallel electrodes of a given triangle is supplied with DC power with three potentials phase shifted by 1, 120 and 240 degrees; in the case of square electrode arrangements, each of the four electrodes of a given square being supplied with four potentials, phase shifted by 0, 90, 180 and 270 degrees, to the four corners of such adjacent electrodes. At one end of the electrode pattern there is provided a feedback mirror, at the other end an output coupler.

5 Claims, 4 Drawing Sheets

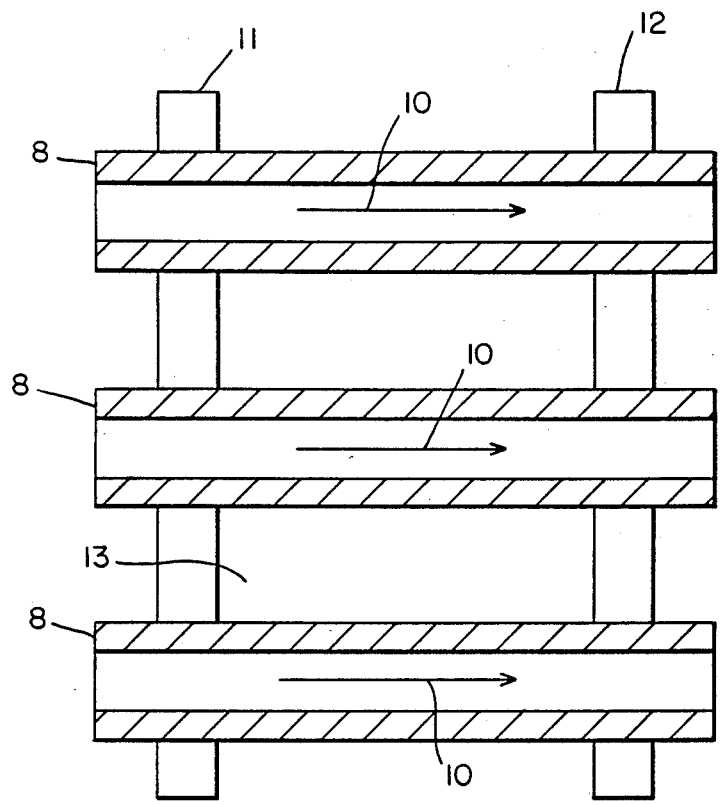
F I G. 5

LASER APPARATUS

FIELD OF THE INVENTION

The invention relates to gas discharge lasers of comparatively small dimensions and high power output. The lasers of the invention comprise a plurality of parallel electrodes which are arranged to define a plurality of imaginary polygons (triangles, squares, hexagons etc.), with a polyphase potential applied to each of these electrodes. The electrodes are preferably hollow and a cooling medium is circulated through them, allowing for efficient heat transfer between the active medium and the cooling means. The invention is illustrated mainly with reference to a triangular and a square honeycomb pattern made up of a plurality of such "triangles" and "squares", defined by the respective electrodes.

BACKGROUND OF THE INVENTION

There is known a wide variety of gas discharge lasers. One of the main problems is how to obtain a high power output per given size (volume) of the laser system. Another problem is how to provide efficient cooling of the active medium, which is usually a low pressure plasma, with a rather low thermal conductivity.

I have recently become aware of a Russian publication in Sov. Phys Tech Phys 23(11) 1978) entitled "Molecular - gas discharge in a rotating electric field" which illustrates a construction with a single four-electrode arrangement, which sets out the basic principle of an arrangement of the present invention. It does not illustrate any multi-triangle or multi-square electrode arrangement, nor am I aware that the teaching of this Russian publication has led to the development of a honeycomb structure of the type which is the subject matter of the present invention. Only the plurality of adjacent geometrical shape electrode pattern makes it possible to attain the main object of the invention: a high-power small size gas discharge laser.

SUMMARY OF THE INVENTION

The main problem in lasers is the cooling of the active medium, usually low pressure plasma with low thermal conductivity.

The present invention enables high heat transfer between the active medium and the cooling element. The heat transfer is done by increasing the number of the electrodes and the total surface of the electrodes. To make the current flow in all areas between the electrodes, polyphase potentials are supplied to the electrodes. Two honeycomb arrays are possible: (1) A triangular structure and; (2) A square structure. The two structures have the same results, however the triangular array has the possibility to connect one electrode to zero potential. In a triangular structure, every three electrodes, out of many others, are situated in parallel, with equal distances between every two electrodes creating imaginary corners of a triangular. In a square structure, every four electrodes, out of many others, are situated in parallel, creating imaginary corners of a square. Every three electrodes that create imaginary triangles are supplied with three polyphase potentials. Every four electrodes that create an imaginary square are supplied with four polyphase potentials. The above is also applicable to arrangements of a honeycomb of a plurality of other geometric shapes, such as hexagons etc. The electrodes are usually made of metal, to allow electric conductivity and thermal conductivity. They are hollow and cooling fluid (gas or liquid) flows through them, usually air, freon, or water. The fluid can come in from one end of the electrode and come out from the other end, or come in and come out from the same end. The profile shape of the electrodes can be circular, hexagon, square, diamond shaped or in another shape, to make homogenous current distribution in the active medium. The sides of the electrodes can be polished for optical reflection and make the laser a waveguide laser. Practical size of electrodes is 3–20 millimeter in diameter, 3–200 centimeter length, and spacing between electrodes 1–50 millimeter. The amplitudes of the potentials are equal, and usually 20–100 volts. The frequency of the potentials is usually 1–300 megahertz. The potentials to the electrodes can be applied to them by coaxial cables, or by the use of transistors attached to the electrodes and cooled by the same fluid passing through the electrodes. The active medium can be molecular gases, mixture of gases, Argon $Co_2$, Co, Xenon, HeNe and others, or liquid, or solid. According to the active medium the laser radiation can be from x-ray to microwave. All electric discharge lasers can be excited by the described method. In the "triangular", array three potentials, phase shifted in 0, 120, 240 degrees are used. The zero degrees potential could be replaced by zero voltage, or ground. When one electrode is connected to ground, only two potentials, with phase shift of 120 and 240 degrees are needed.

In "square" array, four potentials, phase sifted in 0, 90, 180, 270 degrees are used.

At the two ends of the electrodes there are two optical elements for optical cavity. A feedback mirror at one end and at the other end an output coupler, usually with 95 percent reflectance 5 percent transmittance.

To make all the areas of the laser in one phase of radiation, a small part of the output-coupler is changed and replaced with higher reflectance or with a mirror, the radiation between that part and the feedback mirror at the other end will be higher than that of between the output coupler and the feedback mirror. Because the radiation is high, it is independent in phase from leaks from adjacent radiations. The radiation between the reflecting part of the output coupler and the feedback mirror is high and leaks from it determine the phase of adjacent radiation and the adjacent radiations becomes phase locked with the phase of the high radiation. The reflecting part of the output coupler acts as a phase locking mirror. That phase locking mirror should be in round shape, to have basic optical resonance mode, and should be at the center of the output coupler, in order to influence all parts of the laser radiation and should have a diameter to fit between 3 or 4 electrodes.

The electrode arrangement is that of a honeycomb pattern with parallel electrodes defining a plurality of triangles or squares, adjacent each other, there being at least three such triangles or four such squares, preferably a much larger number of such triangles or squares, as will be exemplified with reference to the Example in the following. The arrangement makes possible a high power output with a comparatively small overall size of the laser system. In the following the example is illustrated by means of highly schematical Figures, where the Figures of the single-triangle and single-square structures are intended to explain the background of the invention and its principle, the arrangement of the invention being that of a honeycomb structure with a plurality of such imaginary triangles, squares or other regular geometrical arrangement (such as for example hexagons etc.). This power supply is in each case phase shifted according to the number of the electrodes defining such structure. The increased power output is a direct result of the use of a large number of parallel electrodes, with rather small distances between these (which may be of the order of only some millimeters). The description is highly schematical, but it is quite adequate to provide the man versed in the art with all the information to construct and operate the novel type of honeycomb-electrode arrangement lasers of the invention.

BRIEF DESCRIPTION OF THE DRAWINGS

The invention is illustrated by the enclosed schematical drawings, which are not according to scale, and in which:

FIG. 5 shows in axial cross section view the electrodes, the cooling fluid, the optical elements and the active medium.

More details are in the following descriptions.

Figure 1:
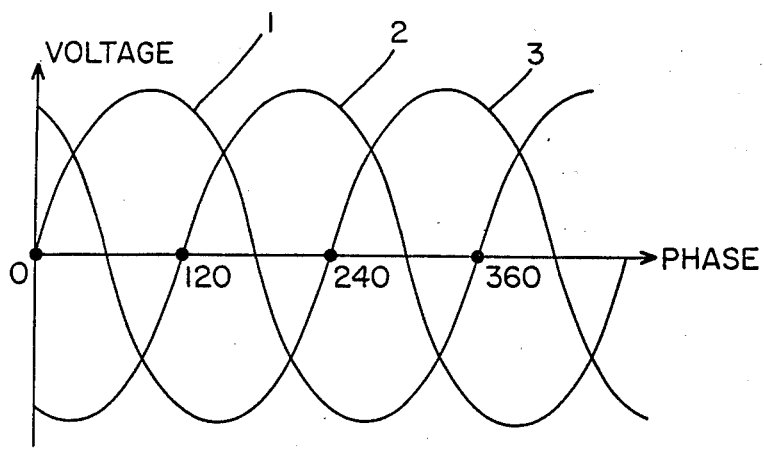
FIG. 1 shows 3 phase potentials.

FIG. 1 shows three sinusoidal voltages: 1,2,3 with the same amplitude, with phase shifts of 0, 120, 240 degrees respectively.

Figure 2:
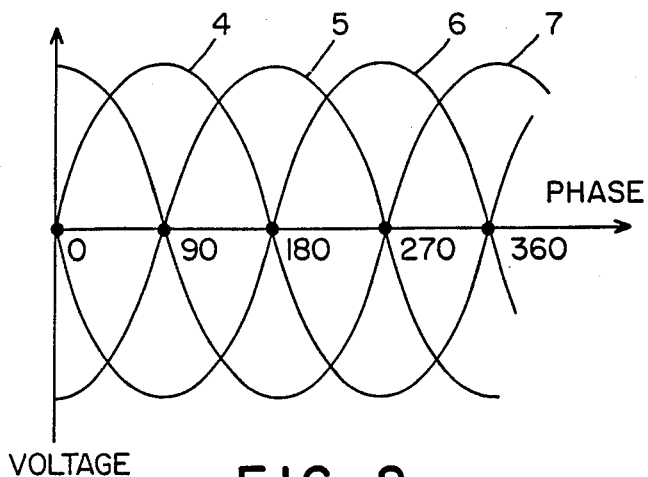
FIG. 2 shows 4 phase potentials.

FIG. 2 shows four sinusoidal voltages: 4,5,6,7 with same amplitude with phase shifts of 0, 90, 180, 270 degrees respectively.

Figure 3:
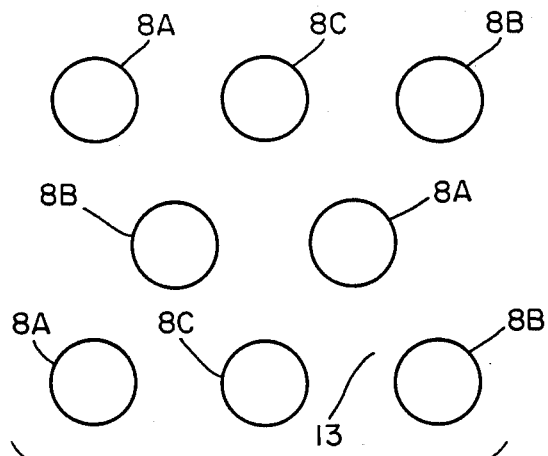
FIG. 3 shows honeycomb array of triangular structure and the three potentials of FIG. 1 supplied to the electrodes in a cross section view.

FIG. 3 shows nine circular profile electrodes "8" disposed in corners of six imaginary triangulars in triangular honeycomb structure. The electrodes marked as 8a, 8b, 8c are supplied with potentials 1,2,3, respectively. Between the electrodes is the active medium 13.

Figure 4:
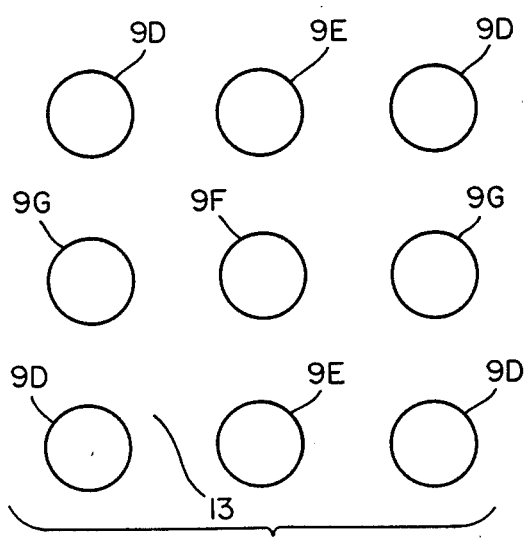
FIG. 4 shows honeycomb array of square structure and four potentials of FIG. 2 supplied to the electrodes in a cross section view.

FIG. 4 shows nine electrodes 9 disposed in corners of four imaginary squares in a square honeycomb array. The electrodes marked as 9d, 9e, 9f, 9g are connected to potentials 4,5,6,7 respectively.

FIG. 5 shows in a cross section view the electrodes 8, the fluid passing through them 10, the feedback mirror 11, the output coupler 12, the active medium 13.

Figure 6:
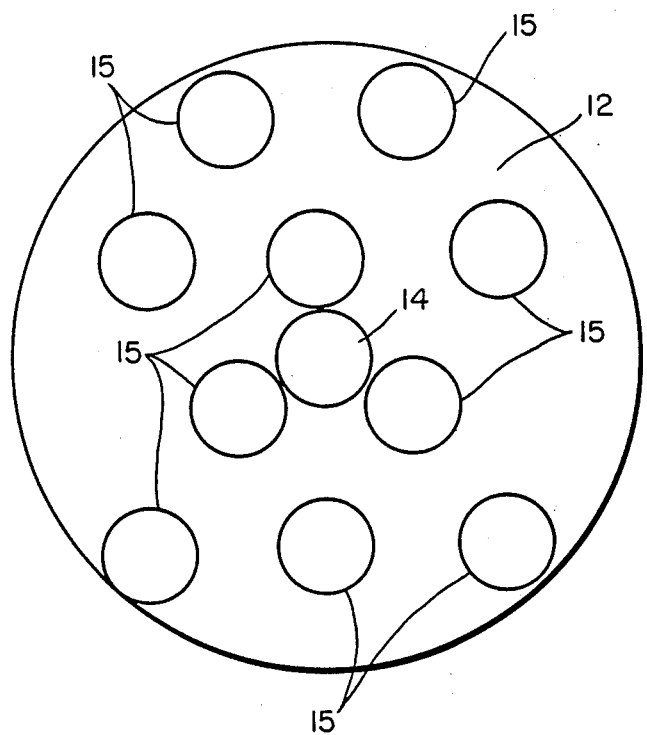
FIG. 6 shows the phase locking mirror at the center of the output coupler.

FIG. 6 shows the phase locking mirror 14 at the center of output coupler 12 and the holes 15 in which the electrodes pass through them.

It is possible to get high power by simply making the laser with more identical electrodes in parallel. In other lasers it is necessary to increase the length or the optical cavity to get one coherent beam. In the invented laser described here the beam will be phase locked because of the phase locking mirror. Although the distance between the electrodes is small, in the order of 3 millimeters, technical difficulties could arise in building milti electrode lasers, such as bending of the electrodes and flow of the cooling fluid through them, in order to allow wider electrodes to be used, a movement of the gas between the electrodes is needed. The gas can be moved by a fan inside the laser or by other means. The energy of the fan should be much lower than in conventional gas flowing lasers.

DESCRIPTION OF THE PREFERRED EMBODIMENT

An array of 100 aluminum electrodes was arranged in parallel in a square structure of a square honeycomb array. The electrodes were arranged in a 10×10 arrangement, each being 50 cm long and 1 cm in diameter, the spacing between electrodes being about 1 cm. The overall size of this laser head was 20×20×50 cm and the volume of the active medium about 15,000 cubic centimeters, the surface area of the electrodes being 15000 square centimeters. The active material used was carbon dioxide. In this array each of the electrodes was connected to three MRF transistors, each of which provides a supply of 500 Watt at 50 Megahertz, the total power of each of the electrodes being 1.5 KW, the overall output of the 100 electrodes being 150 Kilowatt. From this it becomes clear that each square centimeter of electrode surface is supplied with 10 W and every cubic centimeter of the active medium, with 10 W, levels which are common with normal RF excited carbon dioxide lasers. At an efficiency of 10 per cent, the output of the laser is 15 KW, which has a profile of 20×20 cm and which can be focused to about 0.2×0.2 mm by 1:1000 focusing lenses. The beam is a single phase locked beam due to a 1 cm round shaped phase locking mirror at the center of the output coupler, which output coupler has a reflectance of 95 per cent. The power supply of the laser is one of 200 KW, at 50 V D.C, the electrodes being cooled by Freon (T.M.) flowing through them, heat being removed from the FREON by a compressor of 50 KW power consumption. The power output of this laser is a very high one at this small size.

I claim:

1. A gas discharge laser comprising:
   a. a plurality of identical tubular parallel hollow electrodes arranged in a honey comb array of configurations, said honey comb array being centered around at least two axes, each of said axes being surrounded by a number of electrodes equal to the members of said configurations, each electrode being equidistant from said axes and equidistant from each adjacent electrode;
   b. means for confining a gaseous medium in a space surrounding said electrodes, said medium being capable of lasing upon electrical excitation;
   c. means for supplying a polyphase of radio frequency potentials equal to the number of the members of said configurations phase shifted in relation to each other by 360 degrees divided by said number for each electrode;
   d. cooling fluid means for cooling said electrodes upon passing a fluid through said hollow of each electrode; and
   e. means for establishing an optical resonant cavity, for radiation of an excited gas between said electrodes comprising two parallel mirrors on the same optical axis, wherein said axis is parallel to said electrodes, and wherein one of said mirrors is an output coupler which acts as a phase locking mirror to obtain high power output.

2. A gas discharge laser according to claim 1, comprising a triangular honeycomb structure centered around at least two axes, wherein each axis is surrounded by three equal parallel equidistant hollow electrodes, and three radio frequency potentials are shiftable by 0, 120 and 240 degrees from each other, in relation to each of three electrodes forming a triangle.

3. A gas discharge laser according to claim 1, comprising a square honeycomb structure array centered around at least two parallel axes, each axis being surrounded by four equal parallel hollow electrodes, equidistant from said axis and wherein each adjacent electrode forms a square comprising means for applying four radio frequency potentials phase shifted by 0, 90, 180 and 270 degrees from each other, in relation to each of four adjacent electrodes, to form a rotating electrical field.

4. A gas discharge laser according to claim 1, wherein the electrodes are highly polished to provide an optically reflective surface.

5. A gas discharge laser according to claim 1, wherein radio transistors are attached to each of said electrodes to supply radio frequencies to each electrode and said transistors are capable of being cooled by a flowing cooling fluid.

* * * * *